United States Patent [19]

Krave

[11] 4,292,760

[45] Oct. 6, 1981

[54] METHOD, APPARATUS AND PACKAGE FOR SPROUTING SEEDS

[76] Inventor: Carl A. Krave, 5531 Limeric Cir., #16, Wilmington, Del. 19808

[21] Appl. No.: 58,820

[22] Filed: Jul. 19, 1979

[51] Int. Cl.³ ............................................. A01G 31/02
[52] U.S. Cl. ............................................. 47/14; 47/84
[58] Field of Search .................. 15/244 C; 521/61; 47/14–16, DIG. 7, 59–65, 80, 56, 84

[56] References Cited

U.S. PATENT DOCUMENTS

| | | | |
|---|---|---|---|
| 2,988,441 | 6/1961 | Pruitt | 47/DIG. 7 |
| 3,171,820 | 3/1965 | Volz | 521/61 |
| 3,476,933 | 11/1969 | Mendelsohn | 521/61 |
| 3,608,238 | 9/1971 | Reuter | 47/64 |
| 3,703,786 | 11/1972 | Swan | 47/56 |
| 3,798,836 | 3/1974 | Rubens et al. | 47 DIG. 7/ |
| 4,034,506 | 7/1977 | Kasahara et al. | 47/64 |
| 4,086,725 | 5/1978 | Li | 47/61 |

FOREIGN PATENT DOCUMENTS

| | | | |
|---|---|---|---|
| 829094 | 6/1938 | France | 47/14 |
| 2014836 | 9/1979 | United Kingdom | 47/64 |

*Primary Examiner*—Robert E. Bagwill
*Attorney, Agent, or Firm*—Connolly and Hutz

[57] ABSTRACT

A pad (16) of open celled fully reticulated polyurethane foam which is substantially hydrophobic serves as a bed for growing sprouts (14) from seeds (12). A high percentage of interconnected voids in the pad (16) provide a high degree of permeability to air flow and the material has surface properties, which retain adhered droplets of moisture providing humid environment without holding localized moisture which might prevent the free flow of air through the pad. The bulk of any applied water or mist is drained through or away from the pad, thus flushing impurities from it. A loose cover sheet of film (15) helps retain a humid atmosphere and pad (16) may be wrapped in such a sheet (18) to package the sprouts (14). The pad (16) may be transferred to a shipping tray (34) after the seeds are sprouted or may be originally placed in it. The pad (16) and tray (34) may have an extended lip (38) for collecting moisture when the package is inclined on end to provide optimum conditions during storage. A portable germinating device (10a or 10b) includes layers of the aforementioned pad (16a or 16b) within a shallow dish (34a or 34b) and cover (42a or 42b) having variable apertures (54a) through which water and air may pass.

13 Claims, 17 Drawing Figures

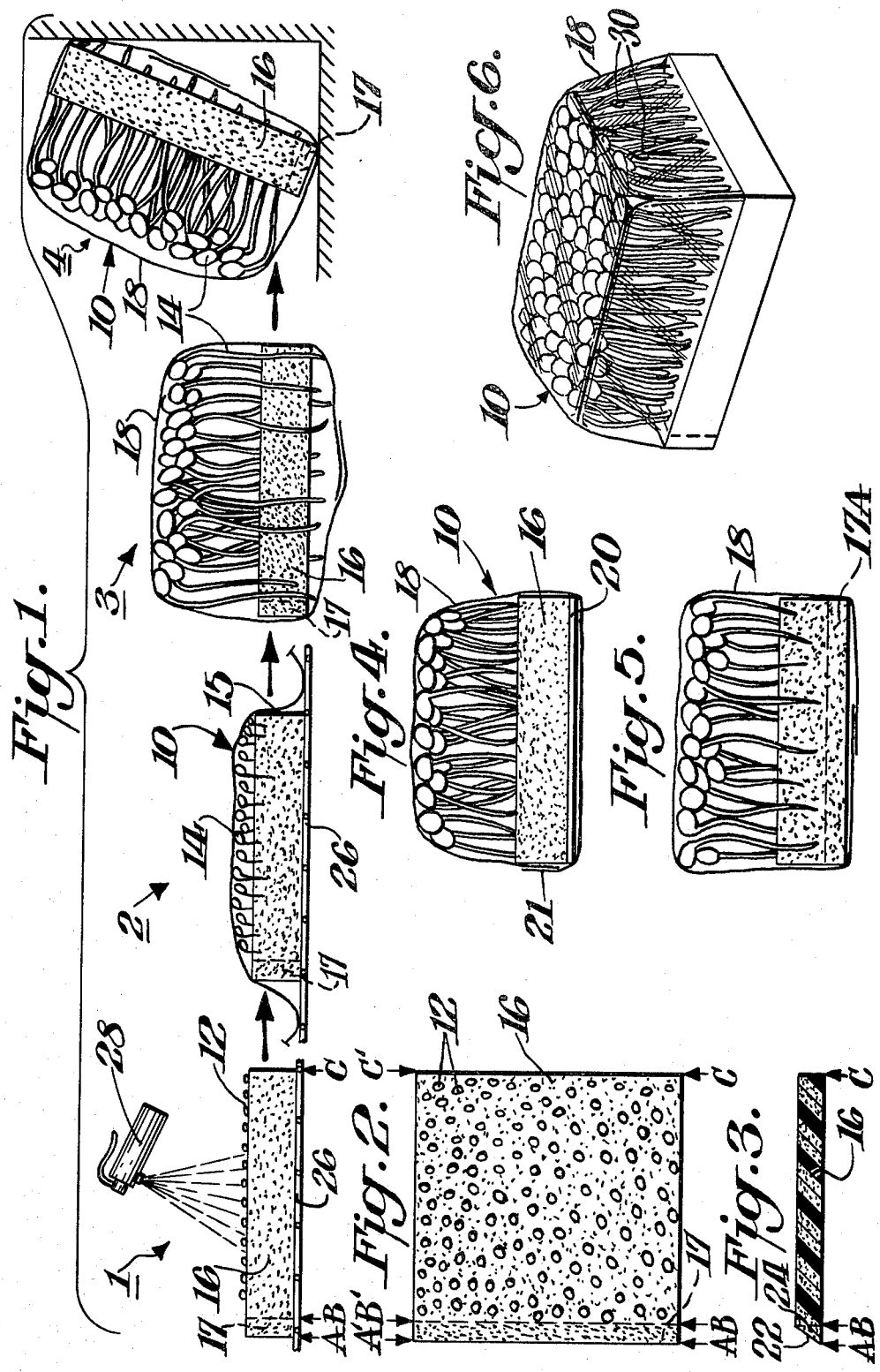

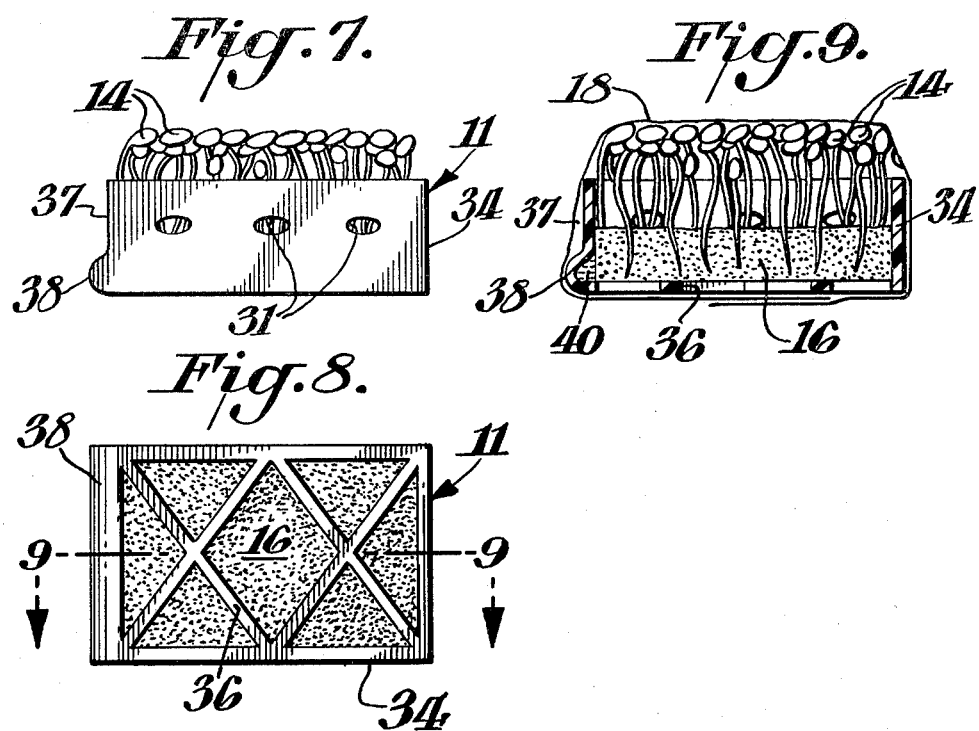
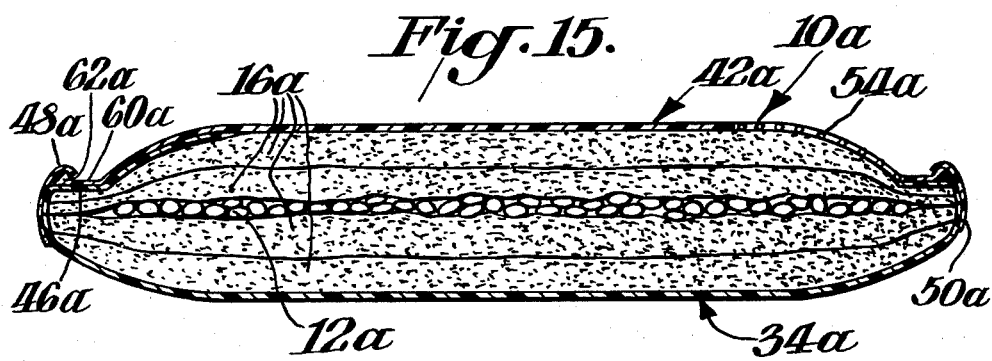

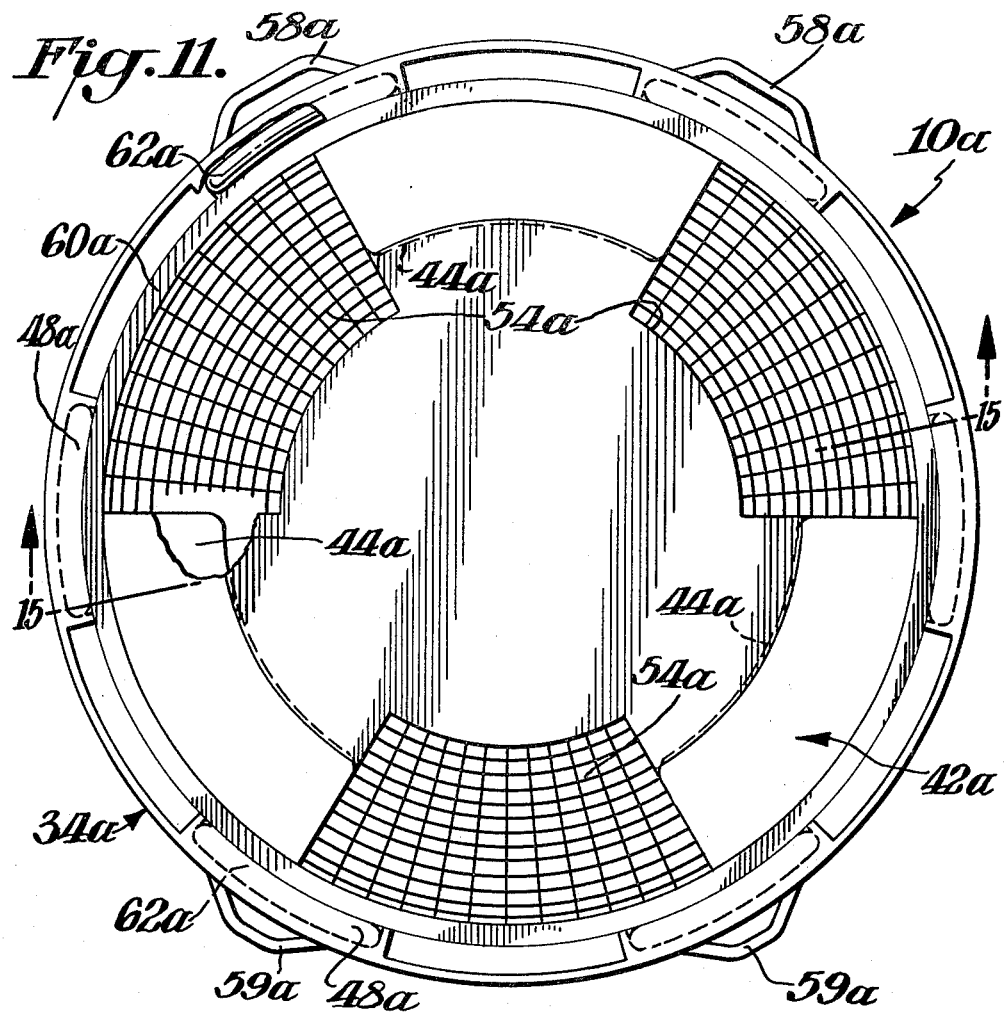
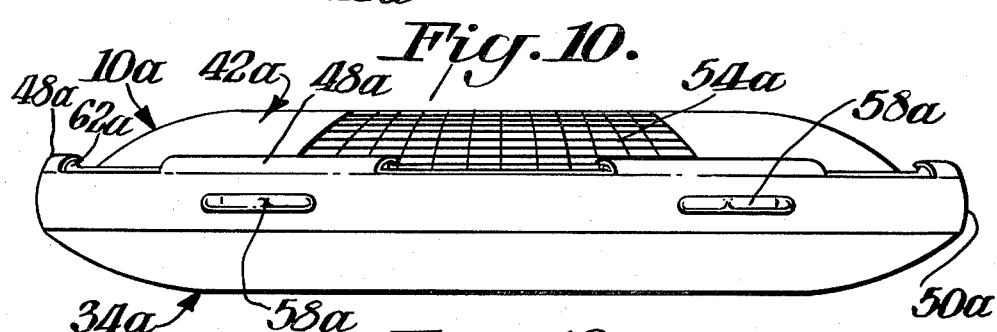

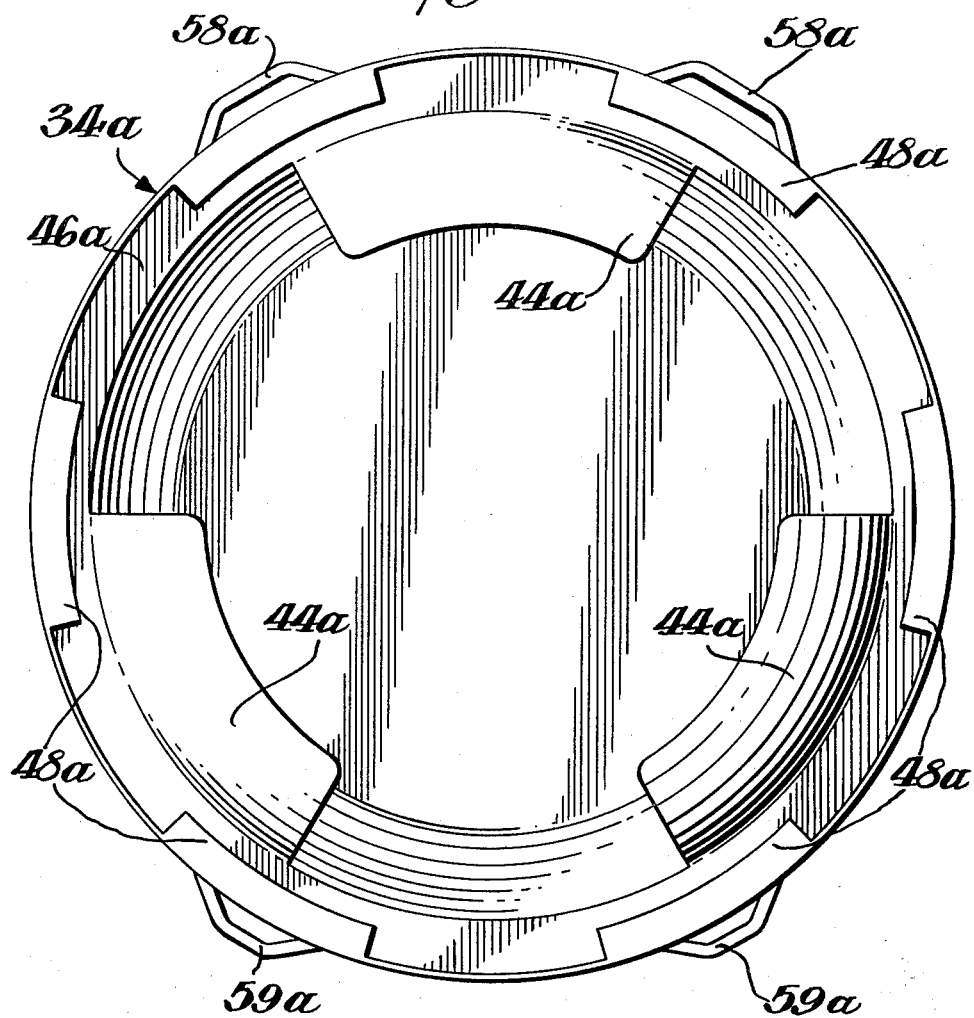
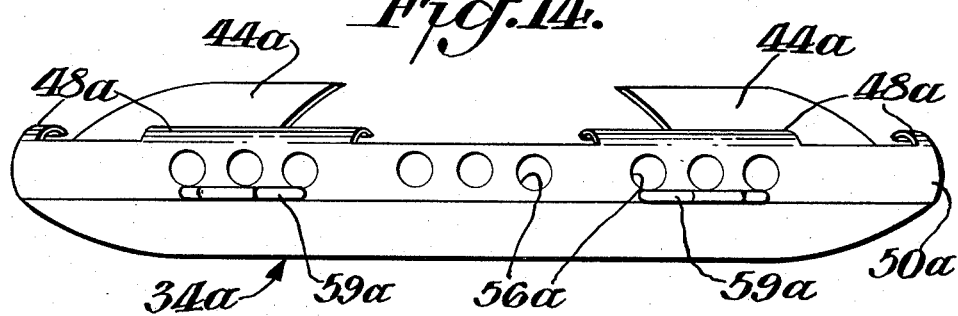

METHOD, APPARATUS AND PACKAGE FOR SPROUTING SEEDS

BACKGROUND OF THE INVENTION

The present invention provides method and apparatus for growing, packaging and storing sprouts from the seeds of legumes, grains and vegetables in a simple efficient manner.

The acceptance of sprouts as food is influenced by their taste and appearance. Fresh sprouts are easily perishable and may rapidly lose their nutritional value, flavor and natural crispness in handling, transport and storage prior to consumption.

Sprouts are commonly grown for human and animal consumption by subjecting seeds of legumes, grains and vegetables to controlled conditions of temperature, light and humidity. Frequently, the mature sprouts are transferred from the original growth apparatus to another container for packaging, transport or storage prior to consumption. Commonly, the mature sprouts are lumped together in a contiguous fashion and enclosed in an air-tight container to maintain moisture and resist external contaminants.

Sprouts bruised or otherwise damaged during handling or transport may be more susceptible to rapid decay. Furthermore, the common storage practice of contiguous placement of succulent mature sprouts may greatly restrict the even flow of air and other gases inside the container. Moisture trapped inside the container during the transfer from growing apparatus to storage container, or moisture created through condensation as sprouts are moved from relatively warm (e.g., 60° to 85° F.) environments whcih promote germination to relatively cool environments (e.g., 40° to 45° F.) which help to retard spoilage in storage, may collect unevenly throughout the container (e.g., at low spots, along corners, etc.). The reduction in the free movement of gases around the sprouts and the potentially uneven build-up of localized moisture may increase the rate of decay and reduce the general appearance, flavor and nutritional value of the sprouts most immediately affected by these conditions.

Even with careful attention to moisture levels, handling procedures and removal of damaged or decayed sprouts, decay and deterioration are likely to occur. An object of this invention is to provide an efficient method, apparatus and package for sprouting seeds relatively free from decay and damage.

SUMMARY OF THE INVENTION

In accordance with this invention, a pad of porous material is used for supporting the seeds and germinating the sprouts from them. The porous material is hydrophobic and nonabsorbent. It has a high percentage of interconnected voids providing a high degree of permeability to fluid flow and surface properties, which retain adhered droplets of moisture sufficient to provide a humid growing environment without retaining localized moisture, which might promote decay or block free flow through the pad. Free drainage is, therefore, promoted through and away from the pad. A particularly effective pad is provided by a hydrophobic fully reticulated elastomeric and hydrophobic polyurethane foam with uniform pores. Such pores may range in size, for example, from about 8 PPI (pores per inch) to to 50 PPI. A loose cover sheet helps retain humidity in the pad during germination. The pad may be transferred to a tray after sprouting or initially positioned within the tray. The tray may be stored on end to drain excess moisture into a lower corner of the pad, which may be extended to form a water-retaining pocket. A portable germinating device may have a shallow dish and cover with variable vents and carrying handles.

BRIEF DESCRIPTION OF THE DRAWINGS

Novel features and advantages of the present invention will become apparent to one skilled in the art from a reading of the following description in conjunction with the accompanying drawings wherein similar reference characters refer to similar parts and in which;

FIG. 1 is a schematic diagram showing apparatus and its method of utilization relating to one embodiment of this invention;

FIG. 2 is a top plan view of the germination pad shown in FIG. 1;

FIG. 3 is a cross-sectional view in elevation taken through a variation of the germination pad shown in FIGS. 1 and 2;

FIG. 4 is a side view in elevation of the apparatus shown in FIG. 1 with the addition of an absorbent substrate;

FIG. 5 is a side view in elevation of another embodiment of this invention with a germination pad of extended depth;

FIG. 6 is a three-dimensional view of the package shown in FIG. 1 with ventilation holes in its cover sheet;

FIG. 7 is a side view in elevation of still another embodiment of the germinating apparatus shown in FIG. 1;

FIG. 8 is a bottom plan view of the embodiment shown in FIG. 7;

FIG. 9 is a cross-sectional view taken through FIG. 8 along the line 9—9;

FIG. 10 is a rear view in elevation of a portable germinating device which is a further embodiment of this invention;

FIG. 11 is a top plan view of the embodiment shown in FIG. 10;

FIG. 12 is a side view in elevation of the cover of the embodiment shown in FIGS. 10 and 11;

FIG. 13 is a top plan view of the dish portion of the embodiment shown in FIGS. 10 and 11;

FIG. 14 is a front view in elevation of the dish portion shown in FIG. 13;

FIG. 15 is a cross-sectional view taken through FIG. 11 along the line 15—15;

DESCRIPTION OF THE PREFERRED EMBODIMENTS

Figure 17:
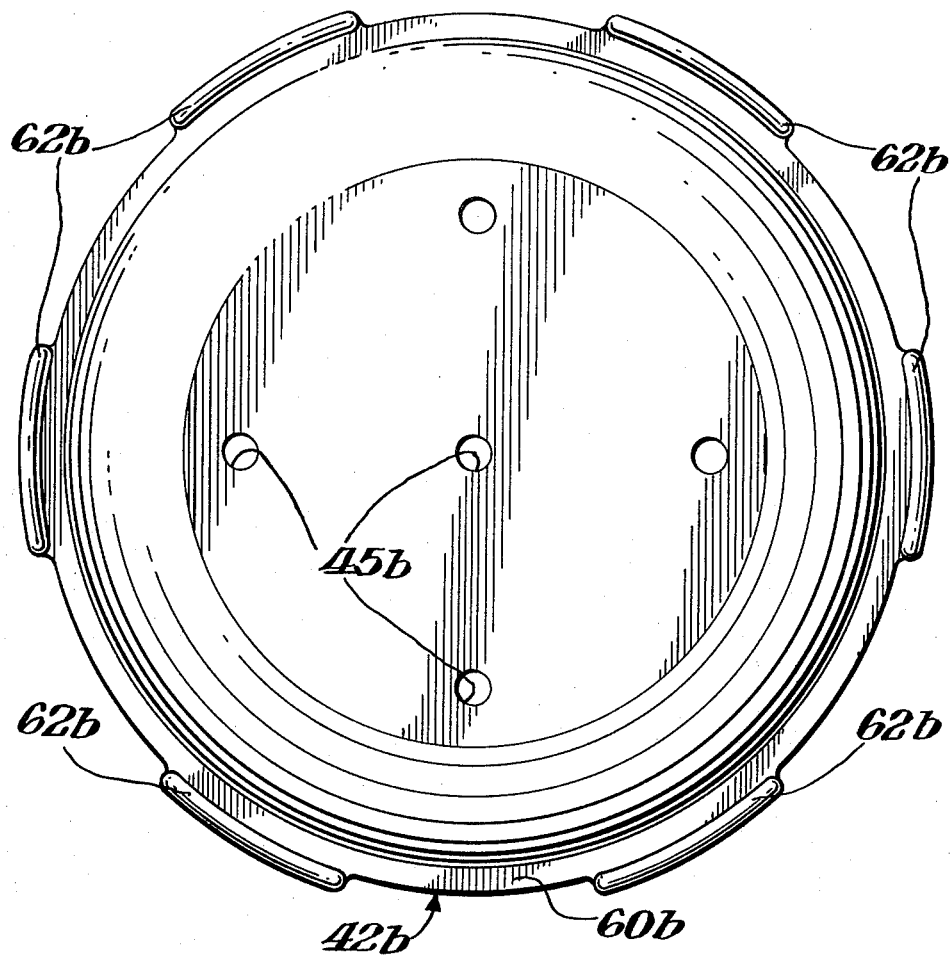
FIG. 17 is a top plan view of the dual-purpose translucent cover shown in FIG. 16.

Considering the drawings in more detail, FIGS. 1 to 6 show one basic form of the apparatus 10 and the method in which it is used for sprouting plant seeds 12 (including grains) growing the plant sprouts 14 to maturity and packaging plant sprouts 14 for transport and storage prior to consumption—in accordance with the invention. Apparatus 10 is comprised of a polyhedral germination pad 16 and cover means 18 for enclosing the mass of plant sprouts 14. Cover means 18 is, for example, a polyethylene film. Optionally, a sheet of absorbent material 20, such as paper towels, may be included between the bottom of germination pad 16 and film covering 18 as shown in FIG. 4.

Germination pad 16 may be made of one or more layers of a three-dimensional skeletal structure of strands preferably of a substantially hydrophobic material (e.g, hydrophobic polyurethane) with a substantially constant percent of void (e.g., 97%) and a high degree of permeability and a low resistance to air flow.

A preferred material for germination pad 16 may be a flexible, resilient, elastomeric, open cell, fully reticulated foam of a substantially hydrophobic material, such as polyurethane. Scott polyurethane filter foam, Scott Paper Company, Chester, Pa., is highly effective. Pore sizes may be varied to accommodate different sizes and types of sprouts (e.g., pore size 20 PPI may be used with alfalfa sprouts). Operative pore sizes range from about 8 to 50 PPI.

An itemized list of the properties of the preferred germination pad may be useful in the description of the embodiments of the invention.

Pad Structure

A. It has an open cell, fully reticulated, three-dimensional skeletal structure of strands with a substantially constant percentage of void space, high degree of permeability, low resistance to air flow, relatively large internal surface area.

1. Moisture may adhere to surface area of strands without substantially restricting the free flow of air and other gases. This promotes desirable levels of humidity without restricting the flow of air (which provides oxygen for the process of respiration) or the efflux of waste gases (e.g., carbon dioxide and other gases, the presence of which may retard or restrict germination—see L. O. Copeland, Principles of Seed Science and Technology, Burgess Publishing Co. 1976 Chapter 4).

2. The fully reticulated structure of strands allows a more uniform dispersion of droplets of moisture through the pad and minimizes the possibility of moisture buildup at any one particular spot which may breed harmful organisms.

3. The skeletal structure/size of pores may be fabricated to accommodate the size and type of sprout as well as growing conditions (e.g., level of humidity in the growing environment).

4. The presence of air flowing through a moist pad allows the germination pad to act as an evaporative cooling device and facilitates the cooling of the sprouts which tend to heat up as they grow (see L. O. Copeland, *Principles of Seed Science And Technology*, Burgess Publishing Co., 1976, Chapter 4.).

B. Hydrophobic, nonabsorbent.

1. This is to facilitate drainage and the efflux of wastes, impurities and excess water which could more readily cling to an absorbent, hydrophilic material and promote the growth of undesirable organisms. A hydrophilic pad where the material (strands) may actually swell upon exposure to moisture would restrict the air space and air flow necessary for respiration and the efflux of waste gases and other waste materials.

2. It facilitates the regulation of moisture/humidity as the sprout parts (roots) grow into the pad. Since moisture clings to or is absorbed by hydrophilic material, it would be difficult to remove excess moisture from the pad without damaging growing sprout parts (i.e., one cannot "wring it out").

3. Substantially uniform pores of a size substantially large to accommodate growing sprout parts (roots) of desirable dimensions would substantially preclude retention of moisture by capillary attraction which may occur in fully reticulated foams made of hydrophobic materials but of relatively small pore size (e.g., pore sizes substantially smaller than 50 PPI).

C. Flexible, resilient, elastomeric, not easily broken apart, resistance to and recovery from deformation.

1. Resistance to and recovery from deformation aids in cushioning sprouts from damage in handling, transport, etc.

2. It facilitates removal of sprouts (roots) from pad.

3. It facilitates the possible reuse of the pad.

4. Allows for the accommodation of growing sprout parts (e.g., roots) without altering the general shape of the pad (i.e., the structure of surrounding strands is not substantially altered).

5. It minimizes the degree of force or resistance applied to growing sprout parts (e.g., roots) as they expand into the growing medium (i.e., the germination pad). Note that the use of loosely interwoven strands of nonresilient material may be used if the growing sprout parts (e.g., roots) are able to displace the strands as they extend into the pad without sacrificing desireable characteristics of succulent sprouts (e.g., root dimensions) or growth rates.

6. It facilitates the fabrication of the germination pad into shapes which accommodate different containers, particularly as sprouts grow and expand.

D. Other Properties

1. Many color possibilities of the pad may enhance the appearance of sprouts for consumer display.

2. Small areas of the pad are strong enough to be self-supporting, ruling out the need for additional supports, etc.

3. Lightweight.

4. Easily cleaned.

5. Nonleaching. Additives may be added to pad which will favorably affect growing conditions.

The germination pad 16 (of one or more layers) may have six rectangular sides, as in FIGS. 1, 2, 4, 5 and 6, or at least one nonrectangular edge 22, as in FIG. 3. In FIG. 3, this configuration defines an extended lip 24 which serves to facilitate the creation of an area for the collection of excess moisture away from the sprout parts when stored in an inclined manner described.

FIG. 1 illustrates the sequential steps of a method of growing sprouts from seeds to final packaging. In step 1, the germination pad 16 is placed in an environment of controlled conditions of temperature, light and humidity which facilitate the germination of the seeds 12 to be sprouted.

Seeds 12 (e.g., alfalfa) which have been soaked in luke-warm water (e.g., 80° to 90° F. for 8 to 10 hours) may be placed evenly on the pad 16 within the area bounded by BB' and C'C' in a substantially uniform manner which will leave an area 17 on the pad to one side of the pad uncovered with seeds. As shown in FIG. 1 and FIG. 2, the area bounded by the rectangle AA' BB' contains no seeds. The seeds and pad may be periodically misted with water by spray can 28 (e.g., twice daily) allowing excess moisture to drain away from the pad.

The pad is preferably placed on a surface which allows ventilation from below, such as a screen or metal grill 26. The pad is placed on this surface in such a way that the top side of the pad is substantially flat (horizontal) in the germinating position and placed in a manner such that the roots, drawn by gravity and the flow of excess moisture, will grow substantially into the pad as in FIGS. 1 and 5.

In step 2, a temporary cover 15, for example, of nonporous polyethylene film or of moistened paper towels, may be loosely placed over seeds and pad to help retain moisture as needed and repositioned after each misting.

Carbon dioxide is heavier than air. As sprouts respire, carbon dioxide is released and may escape through the bottom of the pad. With a nonporous cover, air may be available at the top of the pad, perhaps more readily than at the bottom. Further, condensation may form on the inside of the nonporous cover. These factors may help to explain the phenomenon of significant sprout growth up and away from the pad, rather than substantially through and below the pad.

As sprouts approach maturity, the sprout-impregnated pad may be removed from the ventilated growth surface 26 and completely covered with a film-covering 18 as shown in step 3. The film-covering 18, preferably nonporous, may be constructed of one or more pieces and may be secured substantially on the bottom side of the pad as in FIG. 5, or one one side of the pad at 21, as shown in FIG. 4. Various methods may be employed to secure the film on one or more sides, such as tape, adhesive or surface adhesion. As shown in step 3, the root tips may extend beyond the pad 16.

The film covering 18 may be constructed to have holes 30 for ventilation as in FIG. 6 if the apparatus is to be stored in an area that will provide sufficient humidity to prevent excessive dehydration of sprout tissue. If sufficient humidity is not assured, the film-covering will be preferably non-porous.

With some sprouts, such as alfalfa, it is preferred to consume sprouts that have been exposed to light for "greening". Exposure to light increases the level of chlorophyll and enhances the nutritional value, flavor and appearance of the sprouts. In the embodiments described here in FIGS. 1 to 6 (and later in FIGS. 7 to 9) this "greening" process may take place before or after the film-covering has been fashioned over the sprout-impregnated pad. The use of a translucent, nonporous film-covering may allow the "greening" process to take place in areas of substantially lower levels of humidity and temperature. In effect, the apparatus may act as a miniature greenhouse.

As shown at step 4 of FIG. 1, the film-covered pad apparatus 10 may be placed in a substantially vertical position for transport and storage in a manner that restricts the portion of the pad that is void of sprouts, to a position substantially below the rest of the pad. Thus, the unseeded area 17 in FIGS. 1 to 6 may act as a moisture reservoir where excess moisture may be drained away from mature sprouts while, at the same time, the moisture reservoir may promote a relatively humid atmosphere within the enclosed apparatus which helps to maintain the succulent flavor and appearance of the sprouts. Sprouts are commonly stored in airtight containers in temperatures (e.g., 40° to 45° F.) substantially below the temperatures required for germination (e.g. 60° to 80° F.). During this transfer, moisture may condense inside an airtight container and ultimately drain into and collect within, for example, low spots of the storage container or between and along sprout parts.

The presence of localized moisture directly upon sprouts may promote rapid deterioration of the naturally crisp appearance and flavor of fresh sprouts. Uniform spacing of sprouts in a substantially hydrophobic pad of a three-dimensional structure of strands, fashioned to facilitate drainage of excess moisture trapped during packaging or formed through condensation into a reservoir space away from mature sprouts but within the storage container, may promote succulent flavor, appearance and nutritional value and may extend the storage-life of sprouts prior to consumption. A ¼ inch thick pad is particularly efficient.

In FIG. 3, the germination pad 16 is shown with one edge 22 extended outwardly, at AB to form an extension or lip 24 of substantially triangular configuration. With this or similar configuration, seeds may be placed evenly over the entire top of the pad. The film-covered pad apparatus may then be stored in a substantially vertical position with the extension 24, providing a moisture reservoir space similar to that described in Step 4, FIG. 1.

Additional moisture within the film-covered pad apparatus may be desired to maintain overall humidity and/or localized moisture for specific areas (e.g., for root tips that may extend beyond the bottom of the pad, as in FIG. 1). This may be accomplished as shown in FIG. 4 by placing an absorbent material, such as a sheet of paper towel 20, between the film-cover 18 and pad 16 along the bottom or one or more sides of the pad. Absorbent paper towel material 20, is moistened and placed along the bottom side of the pad, in-between the film-cover 18 and the pad 16. With the film-covered pad apparatus inclined in a substantially vertical position, as described above, excess moisture is drained into folded areas 21 of film 18, away from sprouts 14, as moisture is retained along the bottom side of the pad to maintain overall humidity within the film-covered pad apparatus or to maintain the succulence of root tips that may emerge through the bottom of the germination pad. The absorbent material may be placed such that some portion of it may extend into or adjacent to the moisture reservoir. In this case, moisture may be absorbed into the absorbent material away from the moisture reservoir and wicked up into other parts of the absorbent material not directly within or adjacent to the moisture reservoir, thus facilitating the dispersion of moisture within the film-covered pad apparatus.

FIG. 5 shows extended bottom 17A of pad 16 for retaining excess moisture. FIG. 6 shows ventilation holes 30 for moist environments.

In another embodiment, shown in FIG. 7–9, sprouts and pad are enclosed by an open dish 34. Dish 34 is constructed of a somewhat rigid, nonporous, nonleaching material, such as plastic or aluminum having at least one sidewall. In FIGS. 7 to 9 the dish is shown as having substantially rectangular sides and a bottom consisting primarily of crossmembers 36 to allow maximum ventilation through the bottom of the germination pad 16, as shown in FIG. 8 and FIG. 9. One or more holes or vents 31 may be added to the sidewalls to increase ventilation as needed, as shown in FIG. 7 and FIG. 9.

At least one sidewall is constructed so that an extension or lip 38 extends beyond the lower end of the sidewall 37 and away from the pad 16, as shown in FIG. 7 to FIG. 9. In the preferred embodiment, this lip is constructed so that it lies adjacent to at least one sidewall of the pad, forming a space or well 40 between them.

In the method shown in FIG. 7 to FIG. 9, soaked seeds 12 are placed evenly over the entire top of the germination pad 16. The pad rests completely within the dish 34 being supported on the bottom by dish cross-members 36. The pad-dish apparatus 11 is preferably placed on a surface which allows ventilation from below, such as a screen or metal grill, not shown, and is placed on this surface in such a way that the top side of the pad is substantially flat (horizontal) and placed in a manner such that the roots, drawn by gravity and the flow of excess moisture, will grow substantially into the pads as in FIG. 9. In this manner, the sidewalls of the dish may act to restrict the radial (lateral) expansion of sprouts as they grow. Vents 31 increase the flow of air and other gases around the pad. The side of the tray may be of open lattice constructed to facilitate air and water flow through them.

In both methods, the pad of the pad-dish assembly is placed in an environment of controlled conditions of temperature, light and humidity which facilitates the germination of the seeds to be sprouted. The pad or pad-dish assembly may be periodically misted with water (e.g., twice daily) allowing excess moisture to drain away from the pad. A cover 15, for example, of nonporous polyethylene film, or of moistened paper towel, may be loosely placed over seeds and pad or pad-dish assembly to help retain moisture as needed and repositioned after each misting.

In the first method of FIG. 1 (using the pad resting on the growth surface outside of the dish) as sprouts approach maturity, the sprout-impregnated pad may be placed carefully inside the dish shown in FIG. 9. In the second method of FIGS. 7 to 9, this step is unnecessary as the sprout-impregnated pad already rests inside the dish.

The entire pad-dish assembly may then be completely covered with film 18 as in FIG. 9. The film may be completely nonporous or it may be perforated with holes or vents if additional ventilation is desired. These perforations may or may not coincide with dish vents 31 or the space between dish members. In FIG. 9, the film is secured on the bottom of the pad-dish assembly 11.

With some sprouts, such as alfalfa, it is preferred to consume sprouts that have been exposed to light for "greening". Exposure to light increases the level of chlorophyll and enhances the nutritional value, flavor and appearance of the sprouts. In the embodiments described here in FIG. 7 to FIG. 9 this "greening" process may take place before or after the film-covering has been fashioned over the pad-dish assembly 11. The use of translucent, nonporous film-covering 18 may allow the "greening" process to take place in areas of substantially lower levels of humidity and temperature. In effect, the apparatus 11 may act as a miniature greenhouse.

The film-covered pad-dish apparatus 10 or 11, is placed in a substantially vertical position for transport or storage such that the extended lip 38 portion of the dish lies substantially below the rest of the dish-pad assembly. Thus, the area 40 in FIG. 9 may act as a moisture reservoir where excess moisture may be drained away from mature sprout parts while, at the same time, this moisture reservoir promotes a relatively humid atmosphere within the enclosed apparatus which helps to maintain the succulent flavor and appearance of the sprouts.

The somewhat rigid sidewall construction of this dish 34 may help to cushion the sprouts from damage or abuse during handling, transport or storage. Note that if the bottom dish cross members 36 are thick enough the space between these cross members 36, the germination pad 16 and the film covering 18 may act as the moisture reservoir and the entire assembly may be stored horizontally instead of vertically. This may obviate the need for extended lip 38.

In another embodiment 10a of the invention, illustrated in FIGS. 10 to 15, one or more germination pads 16a are fashioned to fit inside a dish 34a-lid 42a assembly. The object of this invention is to provide a portable, durable, lightweight means and method for growing sprouts efficiently. The portability of this embodiment may be especially attractive to, for example, campers and backpackers.

Dish 34a is constructed of a non-porous, durable and nonleaching material such as plastic or fiberglass. This dish is fashioned to house the pad and sprouts and, in conjunction with lid 42a, may be used to regulate the availability of air and the retention of moisture necessary for sprout growth. Dish 34a should be deep enough to hold enough water for proper soaking of seeds if an additional soaking container is not obtainable. The dish should be made of a substantially opaque material to prevent excessive exposure by light which is known to be harmful to the germination of certain varieties of seeds. This material should be strong enough to provide adequate support for growing sprouts and help to prevent damage to sprouts which may occur during the handling or transport of the device.

Dish-flaps 44a, shown in FIGS. 11, 13, 14 and 15, help to hold the germination pads 16a, in place and, in conjunction with the lid, are used to regulate air flow through lid-vents 54a in cover 42a and the retention of moisture.

The dish-lip 46a helps to keep the germination pads in place inside the dish, facilitates the flow of excess moisture through the dish-drainholes 56a and allows for easy movement of the lid against the dish as the lid is secured to the dish by preventing the lid from coming into direct contact with the pad. Used with the dish-grips 48a, it provides a housing for the lid tabs 62a to hold the lid in place.

Dish-edge 50a is slightly rounded to allow proper drainage of excess water. The dish-edge is slightly thicker and stronger than the bottom of the dish, made of either an extra thickness of the same material or a different material bonded to the body of the dish to promote retention of the dish shape and to provide protection against accidental damage to seeds and sprouts.

Dish-grips 48a in conjunction with the dish-lip 46a are fashioned to house the lid tabs 62a in order to secure the lid in proper alignment with the dish. The dish-grips 48a are fashioned to allow the lid to be secured to the dish in different positions, assuring proper regulation of air and moisture through the lid-vents 54a, see FIGS. 10-12.

The dish drainholes 56a provide drainage of excess moisture and promote air circulation. The dish drainholes are located on the dish-edge opposite the dish-top support loops to allow for proper drainage, see FIG. 14.

The dish-top support loops 58a located on the dish-edge allow the dish-lid assembly to be hung or secured to various objects through the use of hooks, straps, ropes or similar devices.

The dish-bottom support loops 59a located on the dish-edge opposite the dish-top support loops are used to help secure the dish-lid assembly to various objects through the use of hooks, straps, ropes or similar devices, in conjunction with the dish-top support loops 58a.

The lid 42a is constructed of materials with properties substantially similar to the materials used in the construction of the dish 34a. When secured to the dish, the lid helps to secure the germination pads, protects seeds and sprouts from accidental damage and helps to regulate air circulation and moisture retention. The lid may also act as a strainer as the soaked seeds are drained and rinsed before placement on the germination pads.

The lid vents 54a are constructed by fashioning holes or perforations in the lid or by securing to the lid a porous material, such as a screen, that would allow air to circulate through the pads (as the lid is secured to the dish) and water to drain from soaked seeds if the lid is to be used as a strainer. The lid-vents 54a may be used to regulate air circulation and moisture retention when aligned with the dish-flaps 44a at various positions as the lid is secured to the dish.

The lid-edge 60a is located along the perimeter of the lid 42a and rests on the dish lip 46a as the lid is secured to the dish. The lid-edge 60a helps to retain the shape of the lid and is constructed of material of a thickness equal to or greater than the thickness of the larger part of the lid.

The lid tabs 62a are located on the lid-edge 60a and are used to secure the lid to the dish as the lid tabs 62a rest between the dish-lip 46a and the dish grips 48a. The lid is secured to the dish as the lid tabs 62a are slid along the dish-lip 46a until the lid tabs 62a reach and slide under the respective dish-grips 48a until excessive movement of the lid is retarded.

To grow sprouts from plant seeds using this apparatus, soaked seeds may be placed on or in the germination pads 16a, with damaged seeds being removed. Pads 16a may be placed inside the dish in such a way that will cushion seeds and sprouts from damage. The lid 42a is secured to the dish 34a and the entire assembly may be rinsed in cool water and hung from the dish-top support loops 58a to allow excess moisture to escape through dish-drainholes. The dish-lid assembly may be rinsed daily (e.g., twice daily) and placed in a space where fresh air may circulate through the pads. The lid-vents 54a may be adjusted in position to regulate air and moisture. After several days, depending on the seed used, the temperature, humidity, rinsing frequency, etc., the sprouts may be consumed or stored for future consumption. Note that storage may be facilitated through the use of a film-cover fashioned around a sprout-impregnated pad, as previously described.

Figure 16:
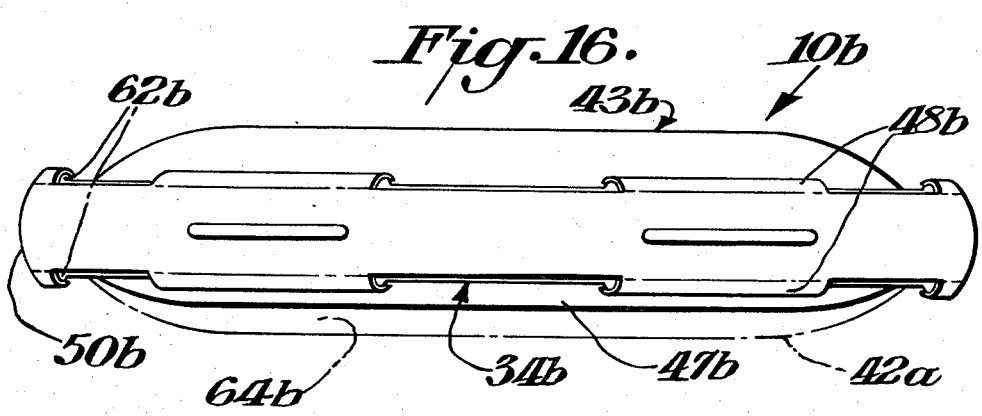
FIG. 16 is a side elevational view of still another embodiment of a portable germinating device illustrating the dual purpose cover side elevation and in phantom outline below the dish.

In a variation 10b of this invention, FIGS. 16 and 17 show how a translucent lid 42b substantially similar in shape, size and construction to lid 42a may be used to allow light to enter into the dish to "green" the sprout-impregnated pads. In this variation, dish-grips 48b are fashioned on both the upper and lower sides of the perimeter of dish-edge 50b, as in FIG. 16. This allows interchangeable use/storage of the two lids as each may be affixed to the dish at the same time. Translucent-lid 42b may have perforations or holes 45b to facilitate ventilation, as shown in FIG. 17. With the translucent-lid 42b in position on the top (open) side of the dish 34b and with sprout-impregnated pads 16b (not shown) positioned in a manner that will not restrict the exposure of light to the sprouts, the sprouts may be "greened" for enhanced appearance, flavor and nutritional value. At the same time, as shown by phantom outline, the lid 42a may be positioned below the bottom 47b of the dish 34b, the space 64b between the lid 42a and the bottom 47b of the dish 34b available for storage of additional seeds, pads, etc.

The following observations may help to summarize the unique features of this embodiment of the invention;

1. The apparatus 10a or 10b is compact, portable, lightweight, easily stored, durable, washable reuseable, easy to assemble and use, made of readily available materials, inexpensive, made of few pieces, aesthetically appealing in that the basic dish-lid assembly can be constructed in a variety of shapes and sizes, made of no moving parts.

2. The somewhat-rigid dish-lid and the (inserted) germination pads provide uniform support for growing sprouts and cushion sprouts from accidental damage from handling or transport.

3. The structure and construction of the germination pad promote desireable levels of moisture retention and air circulation. There are no "wet-spots" where excessive moisture can build up and cause damage to sprouts, since excess moisture is drained through dish-drainholes.

4. Seeds may be arranged on the pad in layers, making it easier to sort and remove defective seeds (without damaging healthy seeds) that may damage or retard the growth of healthy seeds.

5. The easily adjusted lid vent accommodates regulation of air flow and moisture retention to facilitate the use of the apparatus in a wide variety of climates (environments).

6. With air circulation through and around moistened pads, the apparatus acts as an evaporative cooler and facilitates the cooling of sprouts as the process of germination occurs.

7. The dish may be used to soak seeds and the lid may be used as a strainer to drain soaked seeds.

8. The particular structure and construction of the germination pad allows growing sprout parts to expand unimpeded in the "most immediate direction", i.e., the direction of growth is determined by the genetic message determined by the plant tissue in relation to the environment (e.g., gravity, light, etc). and not by surrounding rigid structures. This may facilitate growth since plant energy may be directed toward growth and not to "making space for growth".

9. With the addition of the translucent lid, "greening" of the sprouts is facilitated and storage space for additional pads, seeds, etc., is available.

What is claimed:

1. A seed-germinating combination for growing sprouts from seeds, comprising a pad of porous material supporting a layer of germinating seeds, the pad having a three-dimensional structure of a substantially hydrophobic porous material which is substantially nonabsorbent and having a very high percentage of interconnected voids giving it a very high degree of permeability to fluid flow, the voids providing pores ranging approximately from 8 pores per inch to 50 pores per inch, the porous material having surface properties which in conjunction with the stated pore concentration and size retains droplets of moisture disposed therein sufficient to provide a humid growing environment without retaining localized water in an excess which can promote decay or block free flow of the water and moisture through the pad, and the pad is held on an open support whereby most of any water applied to the pad is caused to flow through and drain out of the pad.

2. A germinating combination as set forth in claim 1, wherein the porous material is an open cell fully reticulated foam having a substantially uniform pore size.

3. A germinating combination as set forth in claim 2, wherein the porous material is flexible, resilient and elastomeric.

4. A germinating combination as set forth in claim 3, wherein the foam is hydrophobic polyurethane.

5. A germinating combination as set forth in claim 1, wherein the pad is approximately ¼ inch thick.

6. A germinating combination as set forth in claim 1, in which a translucent substantially non-porous removable cover sheet covers the germinating seeds and the pad to help retain humidity.

7. A germinating combination as in claim 1, wherein the pad has an edge portion free of seeds.

8. A method of germinating plant seeds and packaging the resulting germinated sprouts, comprising the steps of (a) spread-ing the seeds substantially uniformly upon a pad having a three-dimensional skeletal structure of strands of a substantially nonabsorbent hydrophobic material having a very high percentage of interconnected voids and a very high permeability to fluid flow, the voids providing pores ranging approximately from 8 pores per inch to 50 pores per inch, the porous material having surface properties which in conjunction with the pore concentration and size retains droplets of moisture disposed therein sufficient to provide a humid growing environment without retaining localized water in an excess which can promote decay or block free flow of the water and moisture through the pad, (b) supporting the pad upon an open grill so that most of any water applied to the pad flows through and drains out of the pad, (c) completing the germination of the seeds and the subsequent maturing of resultant sprouts on the pad, with intermittent watering, (d) overwrapping the resultant mature sprouts and sprout-impregnated pad with a translucent wrapper sheet, and (e) securing said wrapper sheet about that combination to provide a package.

9. The method of claim 8 in which the pad has one edge free of seeds and after excess watering the pad is tilted so that it is supported with that edge down to collect excess water and hold it away from the seeds.

10. The package produced by the process of claim 8.

11. The package of claim 10 in which the wrapper sheet has ventilation holes.

12. The method of claim 8 in which a sheet of absorbent paper is placed against the sprout-impregnated pad before the over-wrapping.

13. The package produced by the process of claim 12.

* * * * *